Patented Nov. 22, 1927.

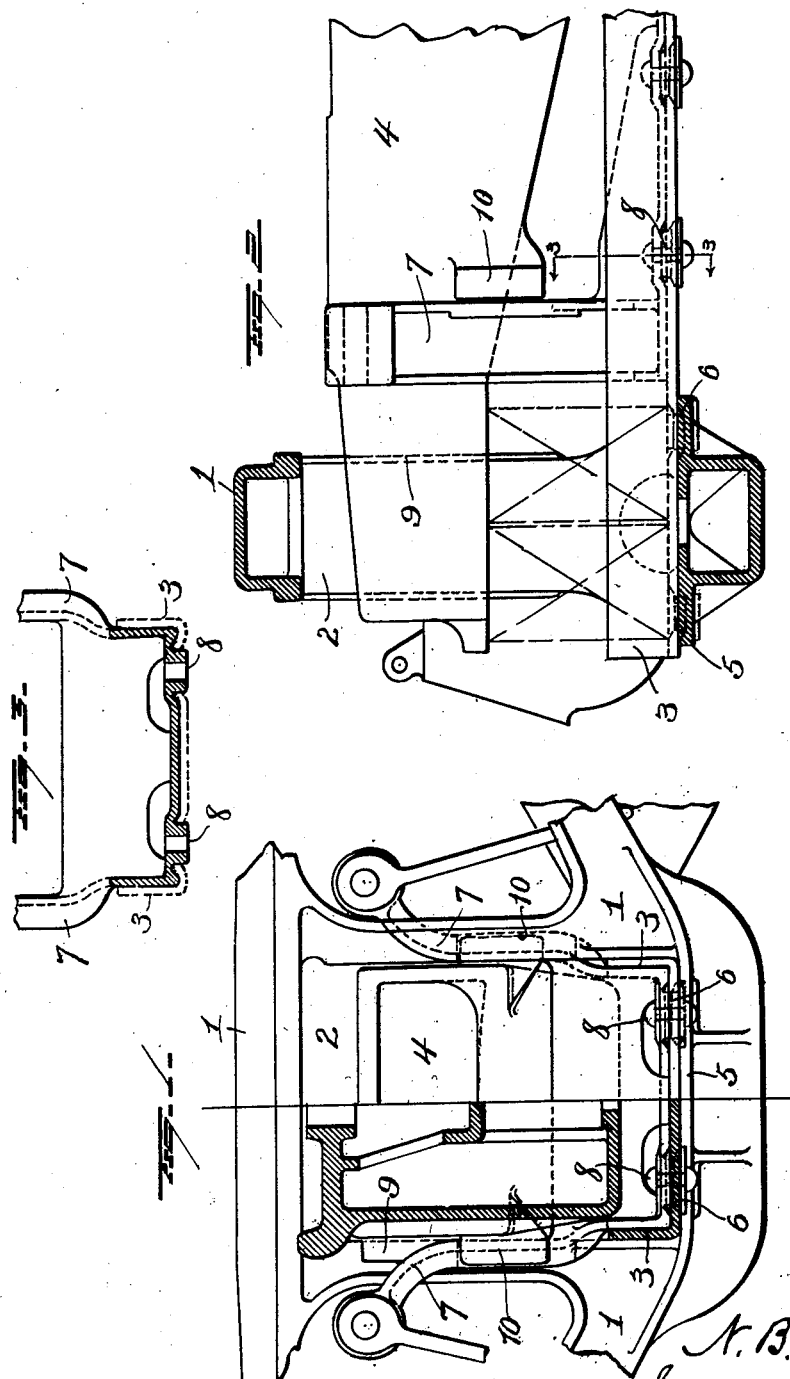

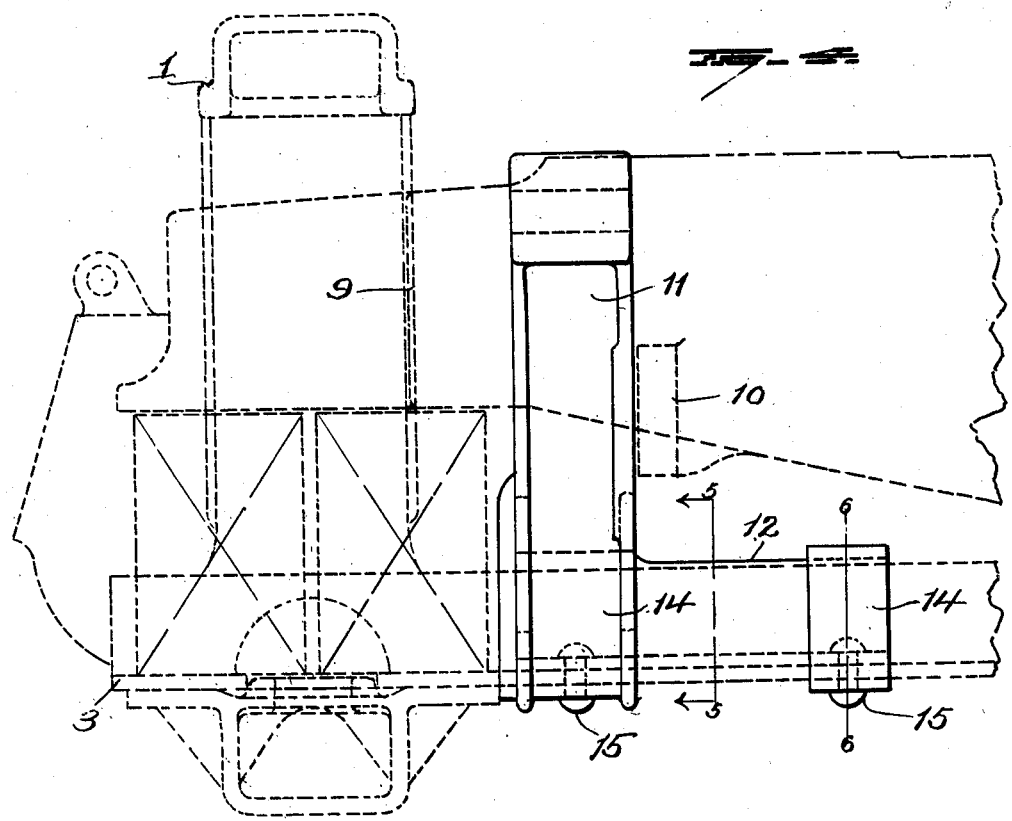
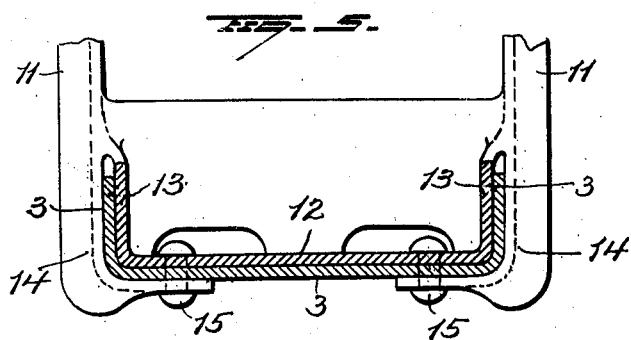
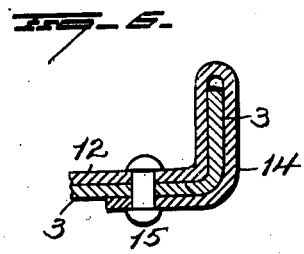

1,650,174

UNITED STATES PATENT OFFICE.

NORMAN BEATTY AKITT, OF WILMINGTON, NORTH CAROLINA, ASSIGNOR TO THE BUCKEYE STEEL CASTINGS COMPANY, OF COLUMBUS, OHIO.

CAR TRUCK.

Application filed December 16, 1925. Serial No. 75,864.

This invention relates to car trucks and has special reference to the spring plank and the brake hanger support, the object being to provide a novel arrangement and construction of brake hanger support which will permit wheel changes to be made without requiring complete disassembling of the truck. The invention is illustrated in the accompanying drawing and will be hereinafter set forth.

In the drawing, Figure 1 is a side elevation, partly broken away, of a portion of a truck embodying the invention;

Figure 2 is a view showing the side frame in transverse vertical section, and a portion of the bolster and the spring plank in elevation;

Figure 3 is a detail section on the line 3—3 of Figure 2;

Figure 4 is a view similar to Figure 2 showing another form of the invention;

Figure 5 is a section on the line 5—5 of Figure 4;

Figure 6 is a detail section on the line 6—6 of Figure 4.

The side frame 1 is of the usual general design having an opening 2 therethrough to receive the ends of the spring plank 3 and the bolster 4, the spring plank being locked to the spring seat 5 of the side frame by bosses and sockets, as indicated at 6. The spring plank is U-shaped in cross section and is formed from pressed steel or similar material. The brake hanger support 7 is also a U-shaped structure of cast steel or the like, and fits snugly in the spring plank between the side flanges thereof and is secured by rivets, as indicated at 8, it being noted that the support has a basal extension which is disposed longitudinally of the spring plank to give stability and rigidity to the support. The bolster is provided on its side with spaced stops or projecting guides 9 and 10 which abut the inner sides of the side frame and the brake hanger support respectively whereby the parts will be guided in their relative vertical movements and the lateral forces distributed so that the tendency of the side frame to rock will be minimized.

In the form of the invention shown in Figures 4, 5 and 6, the side frame 1, the spring plank 3, and bolster 4 are essentially the same as in the first-described form. The brake hanger support 11 is a casting U-shaped to fit snugly between the sides of the spring plank but the basal extension 12 is somewhat shorter than the basal extension shown in Figure 2 and its side members 13 are of uniform height instead of tapering, as in Figure 2. At the inner end of each side member 13 and on each side of the main body of the brake hanger support are formed wings or attaching plates 14 which overhang the upper edges of the side flanges of the spring plank and extend downwardly and inwardly in spaced relation to the sides of the support and the extension so as to bear against the outer side and bottom surfacees of the spring plank, the securing rivets 15 being driven through the ends of said wings and through the floors or bottom webs of the spring plank and the brake hanger support and its extension, as shown clearly in Figures 5 and 6.

When wheel changes are to be made, the spring plank is jacked up until the bosses and sockets, indicated at 6, are disengaged whereupon the side frame may be withdrawn, the spring plank, springs, bolster, and brake parts remaining intact. The construction of spring plank and brake hanger support herein disclosed is practical, may be easily and economically manufactured and possesses high efficiency.

Having fully described my invention what I claim as new and desire to secure by Letters Patent, is:—

1. In a car truck, a side frame, a spring plank locked in the side frame, a bolster having its end inserted in the side frame above the spring plank, a brake hanger support secured to the spring plank and rising therefrom at the side of the bolster, and projections on the bolster abutting the side frame and the brake hanger support respectively.

2. In a car truck, a U-shaped spring plank, and a U-shaped brake hanger support fitting upon the spring plank between the side flanges thereof and rigidly secured thereto, the brake hanger support having an inwardly projecting basal extension resting upon and secured to the spring plank.

3. In a car truck, a U-shaped spring plank, a U-shaped brake hanger support fitting upon the spring plank between the side flanges thereof, and wings on the sides of the support fitting against the sides and bottom of the spring plank, the wings and the support being rigidly secured to the spring plank.

4. I a car truck, a U-shaped spring plank, a U-shaped brake hanger support fitting between the side flanges of the spring plank and having an inwardly projecting basal extension also fitting between the side flanges of the spring plank, and wings on the sides of the brake hanger support and at the inner end of the basal extension thereof, said wings fitting close against the sides and bottom of the spring plank and being rigidly secured thereto.

In testimony whereof, I have signed this specification.

NORMAN BEATTY AKITT.